July 28, 1942.　　　A. J. MUSSELMAN　　　2,291,486

COASTER BRAKE

Filed Jan. 22, 1941

INVENTOR.

ALVIN J. MUSSELMAN

BY Kwis Hudson & Kent

ATTORNEYS

Patented July 28, 1942

2,291,486

UNITED STATES PATENT OFFICE 2,291,486

COASTER BRAKE

Alvin J. Musselman, Cleveland Heights, Ohio

Application January 22, 1941, Serial No. 375,467

1 Claim. (Cl. 192—6)

This invention relates to improvements in coaster brakes, more particularly coaster brakes of the type in which an expansible sleeve is employed to exert braking pressure upon the inner surface of a wheel hub.

One of the objects of the invention is the provision of a braking means which is capable of effecting a smooth application of the brake throughout the life thereof, in other words one in which the natural wear upon the parts does not adversely affect the operation of the brake.

Another object of the invention is the simplification of the brake construction.

Other objects and features of novelty will appear as I proceed with the description of that embodiment of the invention which, for the purposes of the present application, I have illustrated in the accompanying drawing, in which.

Figure 1:
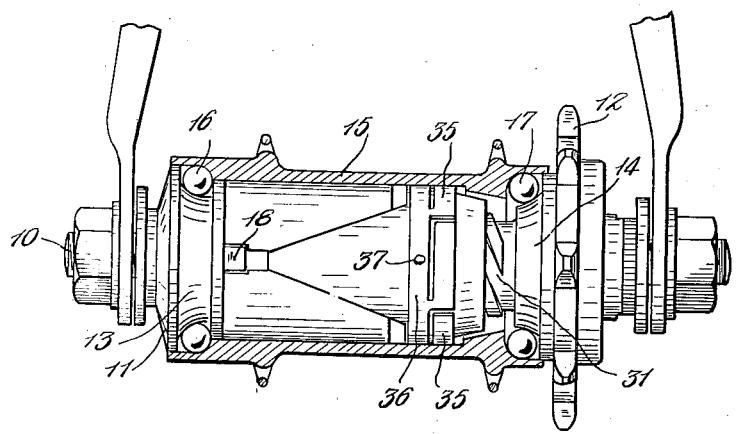
Fig. 1 is an elevational view of a coaster brake embodying the invention, the rear hub of a bicycle being shown in section in operative relation with the brake mechanism.

In the drawing the fixed rear axle of a bicycle is illustrated at 10. Upon the axle there is locked by the usual means a bearing collar or end abutment 11. Near the end opposite the abutment a sprocket wheel 12 is mounted to turn about the axle 10. Collar 11 includes a cone 13 and a similar cone 14 is carried by the sprocket wheel. Between the cones 13 and 14 and bearing surfaces on the hub 15 are two sets of bearing balls 16 and 17, whereby the hub can turn independently of the sprocket wheel, as is well understood in the art.

The collar or abutment 11 has integrally formed therewith a projection 18 which is preferably rectangular in cross section. One outer end of this projection extends radially almost to the inner surface of the hub. The other end is cut back sufficiently to clear a resilient, substantially cylindrical sleeve member 19 that has a normal outer diameter slightly less than the inner diameter of the hub. This sleeve is split, as indicated in the drawing, and the split comprises a portion 20 with straight walls adapted to receive the projection 18 and by this means the sleeve is locked to the collar 11 and thereby prevented from turning.

Figure 8:
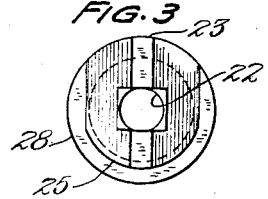
Fig. 8 is an end view of the same.
Figure 7:
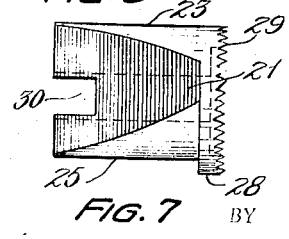
Fig. 7 is a side elevation of a core with its sleeve expanding wedge surfaces.
Figure 9:
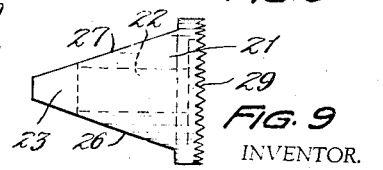
Fig. 9 is a plan view of the construction shown in Figs. 7 and 8.

21 is a solid metal core with a bore 22 therethrough fitting loosely upon the axle 10 so as to be capable of axial movement. At one point this core has a wedge surface 23 that extends upwardly in a radial direction into a wedge shaped opening 24 constituting part of the split in sleeve 19. By this engagement with the sleeve the core member is prevented from turning. Opposite the wedge surface 23 the core 21 is preferably provided with a curved surface 25 formed as a partial cylinder to fit loosely the inner contour of the sleeve. An inspection of Fig. 8 will disclose that the surface 25 may be formed as a sector of a cylinder of one diameter while the outer surface of the wedge part 23 is formed as a sector of a cylinder of somewhat larger diameter. The wedge surface may be provided by cutting away the sides of the core to provide converging planes 26 and 27. At the right hand end of the core the cylindrical surface 23 is continued all the way around the core as indicated at 28, and the extreme end has clutch teeth 29 formed therein. Since the end of the wedge is somewhat narrower than the diameter of the bore 22, the latter runs out into the side planes 26 and 27, and in order to avoid sharp edges I cut away a certain portion of the core as shown particularly in Fig. 7 at 30. Movement of the core to the left as herein illustrated causes the wedge to expand the sleeve 19, as will be obvious.

Fast with respect to the sprocket wheel 12 and the bearing cone 14 there is a hub extension 31 provided with a steep thread 32 which engages a corresponding internal thread on a collar 33 at the forward end of which clutch teeth 34 are formed adapted to engage the teeth 29 of the core 21. This engagement occurs whenever the bicycle rider back-pedals, thereby moving collar 33 to the left. In order to avoid the mere rotation of collar 33 instead of its travel axially slight friction is exerted against the periphery of the collar by spring fingers 35 integral with a ring 36 that is secured to the core 21 by any suitable means, as for example by one or more pins 37. As soon as the clutch teeth 29 and 34 interengage rotation of collar 33 is positively prevented. Thereafter back-pedaling pressure is exerted through the screw 32 to push the core member toward the left.

Figure 2:
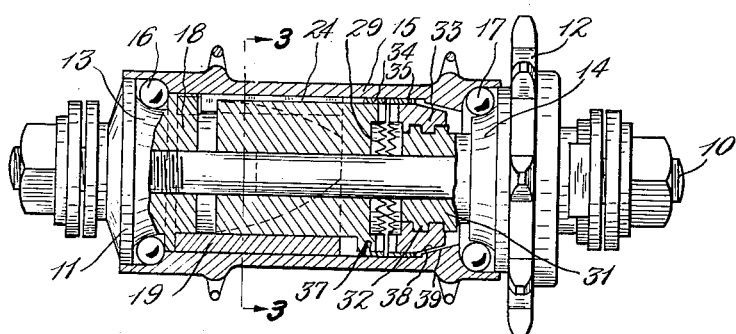
Fig. 2 is a similar view with the brake parts shown in central longitudinal section.
Figure 3:
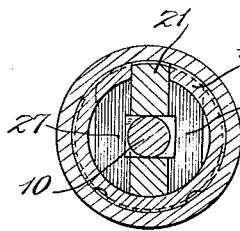
Fig. 3 is a cross sectional view taken substantially on the line 3—3 of Fig. 2.
Figure 5:
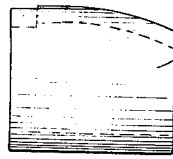
Fig. 5 is a side elevational view of the same.
Figures 4, 6:
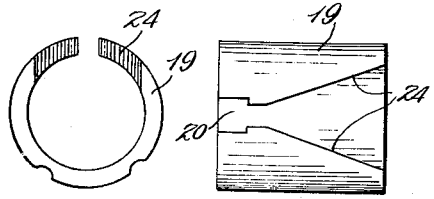
Fig. 4 is an end view of the expansible sleeve.
Fig. 6 is a plan view of the same.

Incidentally the collar 33 and the hub 15 are provided with complementary conical surfaces 38 and 39 which engage when the rider pedals in a forward direction, thereby screwing the collar 33 toward the right until these conical surfaces lock the sprocket wheel to the hub for forward propulsion. For coasting the rider stops pedaling, which causes the sprocket wheel and the hub 31 to stand still. An impulse is then imparted by the hub to the collar 33, turning it upon the screw thread 32 and carrying it to the intermediate position illustrated in Fig. 2, which is the coasting position.

In conventional constructions for coaster brakes of this type, as disclosed in my Patent 1,911,461, issued May 30, 1933, there is a spool longitudinally movable upon the axle carrying the clutch element 29 and forming a support and abutment for a separate wedge member cooperating with the wedge shaped opening 24. The present invention not only substitutes a single part 21 for the spool and wedge of the prior art, but it also eliminates certain difficulties due to wear as between the spool and the projection 18. The core 21 of the present invention need not contact the projection at any time.

Having thus described my invention, I claim:

In a coaster brake, a fixed axle, an end abutment fixed upon said axle, a hollow rotatable hub concentric with the axle, a sleeve with a wedge-shaped opening mounted within the hub, said sleeve being adapted to be expanded into braking relation with the hub, cooperating means between said fixed abutment and said sleeve for preventing rotation of the latter while permitting its expansion, a core member slidable upon said axle, said core member having two opposed cylindrical sectors one fitting within the sleeve and the other fitting within the hub through said sleeve opening, said cylindrical sectors being joined by flat surfaces inclined toward each other to form a wedge, said wedge projecting laterally into said wedge-shaped opening in the sleeve, and means for moving said core lengthwise for expanding said sleeve.

ALVIN J. MUSSELMAN.